United States Patent
Ono et al.

(10) Patent No.: US 10,252,944 B2
(45) Date of Patent: Apr. 9, 2019

(54) HONEYCOMB STRUCTURE AND MANUFACTURING METHOD OF HONEYCOMB STRUCTURE

(71) Applicant: NGK INSULATORS, LTD., Nagoya (JP)

(72) Inventors: Mitsuharu Ono, Nagoya (JP); Shuji Ueda, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 161 days.

(21) Appl. No.: 15/072,764

(22) Filed: Mar. 17, 2016

(65) Prior Publication Data
US 2016/0280605 A1 Sep. 29, 2016

(30) Foreign Application Priority Data
Mar. 25, 2015 (JP) ................... 2015-063428

(51) Int. Cl.
*B01D 46/24* (2006.01)
*C04B 35/195* (2006.01)
*C04B 35/64* (2006.01)
*B01J 35/04* (2006.01)
(Continued)

(52) U.S. Cl.
CPC ........ *C04B 35/195* (2013.01); *B01D 46/2425* (2013.01); *B01D 46/2429* (2013.01); *B01J 35/04* (2013.01); *B01J 37/0009* (2013.01); *B01J 37/08* (2013.01); *C04B 35/64* (2013.01); *C04B 38/0006* (2013.01); *F01N 3/0222* (2013.01);
(Continued)

(58) Field of Classification Search
CPC .. B01D 46/2425; B01D 46/2429; B01J 35/04; B01J 37/0009; B01J 37/08; C04B 35/195; C04B 35/64; C04B 38/0006; C04B 2111/325; C04B 2235/3217;
(Continued)

(56) References Cited

U.S. PATENT DOCUMENTS 3,885,977 A * 5/1975 Lachman ............... C04B 35/195
428/116
4,280,845 A 7/1981 Matsuhisa et al.
(Continued)

FOREIGN PATENT DOCUMENTS

JP 57-082174 A1 5/1982
JP S57-028390 B2 6/1982
(Continued)

OTHER PUBLICATIONS

Japanese Office Action (Application No. 2015-063428) dated Jul. 25, 2017 (with English translation).
(Continued)

*Primary Examiner* — David Sample
*Assistant Examiner* — Elizabeth Collister
(74) *Attorney, Agent, or Firm* — Burr & Brown, PLLC

(57) ABSTRACT

A honeycomb structure includes a cordierite component, and has partition walls defining a plurality of cells which extend from one end face to the other end face and form through channels for a fluid, a thermal expansion coefficient in a central axis direction is 1.2 ppm/K or more and 3.5 ppm/K or less in a temperature change of 40° C. to 800° C., and a thermal expansion coefficient in a cross-sectional direction orthogonal to the central axis direction is 0.8 ppm/K or more and 2.5 ppm/K or less in the temperature range of 40° C. to 800° C.

6 Claims, 2 Drawing Sheets

(51) Int. Cl.
*B01J 37/00* (2006.01)
*B01J 37/08* (2006.01)
*F01N 3/022* (2006.01)
*C04B 38/00* (2006.01)
*C04B 111/32* (2006.01)
*C04B 111/00* (2006.01)

(52) U.S. Cl.
CPC ............... *C04B 2111/0081* (2013.01); *C04B 2111/00793* (2013.01); *C04B 2111/325* (2013.01); *C04B 2235/3217* (2013.01); *C04B 2235/349* (2013.01); *C04B 2235/3418* (2013.01); *C04B 2235/96* (2013.01); *C04B 2235/9607* (2013.01)

(58) Field of Classification Search
CPC ...... C04B 2235/3418; C04B 2235/349; C04B 2235/96; C04B 2235/9607; F01N 3/0222
See application file for complete search history.

(56) References Cited

U.S. PATENT DOCUMENTS

| | | | | |
|---|---|---|---|---|
| 4,385,129 A | * | 5/1983 | Inoguchi | C04B 35/195 501/118 |
| 4,476,236 A | * | 10/1984 | Inoguchi | C04B 35/195 501/118 |
| 4,772,580 A | * | 9/1988 | Hamanaka | C04B 35/195 428/116 |
| 4,854,123 A | | 8/1989 | Inoue | |
| 4,869,944 A | * | 9/1989 | Harada | C04B 35/195 428/116 |
| 5,185,110 A | * | 2/1993 | Hamaguchi | C04B 35/195 264/631 |
| 7,927,682 B2 | * | 4/2011 | Beall | C04B 35/195 428/116 |
| 2007/0166564 A1 | | 7/2007 | Morimoto et al. | |

FOREIGN PATENT DOCUMENTS

| | | |
|---|---|---|
| JP | 08-011194 B2 | 2/1996 |
| JP | 2675321 B2 | 11/1997 |
| JP | 2014-198653 A1 | 10/2014 |
| WO | 2006/103963 A1 | 10/2006 |
| WO | 2010/150609 A1 | 12/2010 |

OTHER PUBLICATIONS

Extended European Search Report (Application No. 16161658.6) dated Sep. 19, 2016.

* cited by examiner

THERMAL EXPANSION CURVE IN CENTRAL AXIS DIRECTION

THERMAL EXPANSION CURVE IN CROSS-SECTIONAL DIRECTION

HONEYCOMB STRUCTURE AND MANUFACTURING METHOD OF HONEYCOMB STRUCTURE

The present application is an application based on JP 2015-063428 filed on Mar. 25, 2015 with Japan Patent Office, the entire contents of which are incorporated herein by reference.

BACKGROUND OF THE INVENTION

Field of the Invention

The present invention relates to a honeycomb structure, and a manufacturing method of the honeycomb structure. More particularly, it relates to a honeycomb structure for use to purify an exhaust gas emitted from a diesel engine, and including a cordierite component which can be fired at a low temperature, and a manufacturing method of the honeycomb structure.

Description of the Related Art

Heretofore, a honeycomb structure made of ceramics (hereinafter simply referred to as "the honeycomb structure") has broadly been used in a use application such as a car exhaust gas purifying catalyst carrier, a diesel particulate removing filter, or a heat reservoir for a burning device. The honeycomb structure is manufactured by preparing a forming material (a kneaded material), extruding the material into a desirable honeycomb shape by use of an extruder, and firing, at a high temperature, a honeycomb formed body obtained by performing raw-cutting, drying and end face finishing.

A diesel engine is operated in an excessive state of oxygen, and hence $NO_x$ cannot be reduced and treated by using a three-way catalyst for use in a usual gasoline engine. As a technology to reduce $NO_x$ in an atmosphere where oxygen is excessive, a selective catalytic reduction (SCR) technology is known. The selective catalytic reduction (SCR) has been developed as a technology of reducing $NO_x$ by use of ammonia as a reducing agent and purifying an exhaust gas from a stationary emission source such as a power station, and a titania-vanadia based catalyst is used.

In recent years, it has been required that $NO_x$ emitted from the diesel engine is purified at a high efficiency, and attempts have been made to apply the above technology concerned with the selective catalytic reduction to a diesel vehicle. For example, there has been developed a technology (see Patent Document 1) of loading a titania-vanadia based catalyst onto a honeycomb structure including a cordierite component (hereinafter referred to as "a cordierite honeycomb") or a technology (see Patent Document 2) of forming the titania-vanadia based catalyst into a honeycomb shape.

The cordierite honeycomb has lattice-like partition walls defining a plurality of polygonal cells which extend from one end face to the other face and form through channels for a fluid. The cordierite component includes three components of silicon, aluminum and magnesium, and a material including the cordierite component has characteristics that its thermal expansion coefficient is low as compared with an alumina material or the like and that the material is excellent in thermal shock resistance and resisting strength. Therefore, the cordierite honeycomb has broadly been utilized in fields of the above car exhaust gas purifying catalyst carrier and the like.

[Patent Document 1] JP-B-H08-011194
[Patent Document 2] JP 2675321

SUMMARY OF THE INVENTION

A cordierite honeycomb has excellent characteristics based on the above cordierite component, but in a case where the cordierite honeycomb is used in a car exhaust gas purifying catalyst carrier or the like, the cordierite honeycomb might cause a problem in respects mentioned below. That is, a conventional honeycomb structure including the cordierite honeycomb is manufactured through a firing step of firing an extruded honeycomb formed body at a high temperature.

Furthermore, a value of a thermal expansion coefficient of the cordierite honeycomb is low, and hence in a case where the cordierite honeycomb is used as a single body of a car exhaust gas purifying catalyst, the above vanadium based SCR catalyst applied and loaded onto partition walls might peel from the partition walls. Here, the above catalyst applied and loaded onto the partition walls usually has a thermal expansion coefficient of about 6 ppm/K, whereas the thermal expansion coefficient of the cordierite honeycomb is lower than that of the catalyst and smaller than 1 ppm/K.

That is, the cordierite honeycomb exposed under a high temperature environment when purifying an exhaust gas only causes very little thermal expansion. On the other hand, the loaded catalyst noticeably causes the thermal expansion under the high temperature environment. As a result, the catalyst might peel from the partition walls. In this way, the catalyst is detached from the cordierite honeycomb, whereby there is the possibility that an exhaust gas purifying performance or the like noticeably deteriorates.

Furthermore, for manufacturing of the cordierite honeycomb, it is necessary to perform a firing step of firing a honeycomb formed body at a firing temperature of 1400° C. or more (e.g., 1430° C.). This firing temperature is high as compared with a conventional ceramic product, and becomes a factor to increase manufacturing cost and equipment cost.

To eliminate such problems, the present invention has been developed in view of the above conventional situations, and objects thereof are to provide a honeycomb structure in which peeling of a catalyst from partition walls can be prevented and firing can be performed at a low firing temperature, and to provide a manufacturing method of the honeycomb structure.

According to the present invention, there are provided a honeycomb structure which solves the above problems, and a manufacturing method of the honeycomb structure.

According to a first aspect of the present invention, a honeycomb structure is provided including a cordierite component and having partition walls defining a plurality of cells which extend from one end face to the other end face and become through channels for a fluid, wherein a thermal expansion coefficient of the honeycomb structure in a central axis direction is 1.2 ppm/K or more and 3.5 ppm/K or less in a temperature change of 40° C. to 800° C., a thermal expansion coefficient in a cross-sectional direction orthogonal to the central axis direction is 0.8 ppm/K or more and 2.5 ppm/K or less in the temperature change of 40° C. to 800° C., and the thermal expansion coefficient in the cross-sectional direction orthogonal to the central axis direction is lower than the thermal expansion coefficient in the central axis direction.

According to a second aspect of the present invention, the honeycomb structure according to the above first aspect is provided, wherein in thermal expansion curves in the central axis direction and the cross-sectional direction, Y is in a range of 0.5X to 1.5X, when an average thermal expansion coefficient in a temperature range of 40° C. to 800° C. is defined as X ppm/K and an average thermal expansion coefficient in a temperature range of 200° C. to 600° C. is defined as Y ppm/K.

According to a third aspect of the present invention, the honeycomb structure according to the above first or second aspect is provided, wherein in a case where three components of silicon, aluminum and magnesium are included as constitutional elements and an oxide total ratio of the three components is defined as 100%, a ratio of silicon oxide is 50% or more, a ratio of aluminum oxide is 15% or more and 45% or less, and a ratio of magnesium oxide is 5% or more and 30% or less.

According to a fourth aspect of the present invention, the honeycomb structure according to any one of the above first to third aspect is provided, wherein a forming material does not include aluminum oxide, aluminum hydroxide or silicon oxide.

According to a fifth aspect of the present invention, the honeycomb structure according to any one of the above first to fourth aspects is provided, wherein a compressive strength of the honeycomb structure in the central axis direction is 15 MPa or more.

According to a sixth aspect of the present invention, a manufacturing method of a honeycomb structure in which the honeycomb structure according to any one of the above first to fifth aspects is provided is manufactured, the method including a forming step of forming, from a forming material, a honeycomb formed body having partition walls defining a plurality of cells which extend from one end face to the other end face and become through channels for a fluid, and a firing step of firing the honeycomb formed body, wherein the highest temperature in the firing step is 1250° C. or more and 1370° C. or less.

In a honeycomb structure of the present invention and a manufacturing method of the honeycomb structure, firing is performed at a firing temperature lower than usual, thereby suitably adjusting a dimensional accuracy of a product shape of a cordierite honeycomb and decreasing a difference between a thermal expansion coefficient of the honeycomb structure and that of a catalyst, so that peeling of the catalyst from partition walls can be prevented. Furthermore, it is possible to efficiently manufacture the honeycomb structure in which firing time is shortened by drop of a firing temperature and manufacturing cost or the like is suppressed.

DESCRIPTION OF THE PREFERRED EMBODIMENTS

Hereinafter, embodiments of a honeycomb structure of the present invention and a manufacturing method of the honeycomb structure will be described in detail with reference to the drawings. It is to be noted that the honeycomb structure of the present invention and the manufacturing method of the honeycomb structure are not limited to the following embodiments, and various design changes, modifications, improvements and the like can be added without departing from the gist of the invention.

Figure 1:
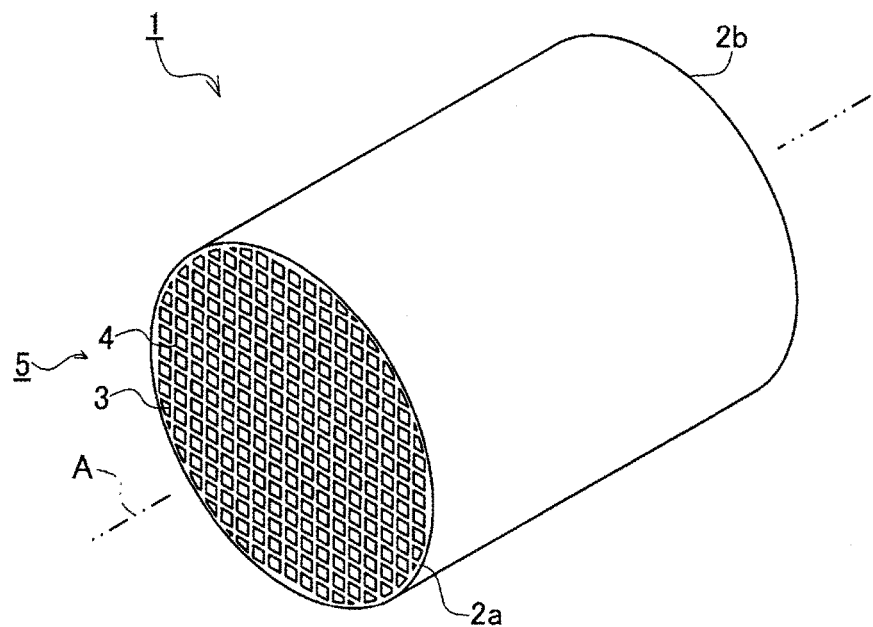
FIG. 1 is a perspective view schematically showing one example of a honeycomb structure of one embodiment of the present invention.
Figure 2:
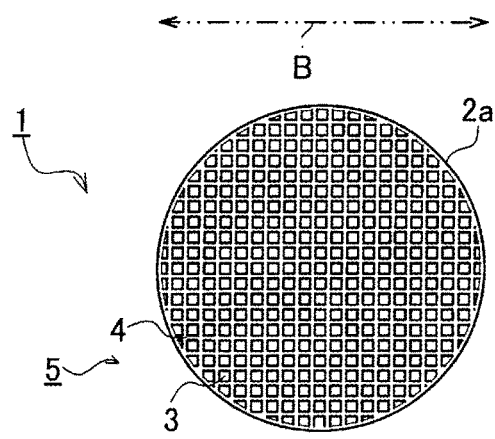
FIG. 2 is a plan view schematically showing one example of the honeycomb structure.

As shown in FIG. 1 and FIG. 2, a honeycomb structure 1 of the present embodiment has a honeycomb structure body 5 including rectangular lattice-like partition walls 4 defining a plurality of cells 3 which extend from one end face 2a to the other end face 2b and form through channels for a fluid, and possesses a round pillar shape.

The round pillar-shaped honeycomb structure 1 includes three components of silicon, aluminum and magnesium as constitutional elements, and a thermal expansion coefficient (the coefficient of thermal expansion (CTE)) in a central axis direction A (corresponding to an axial direction of the cells 3, see FIG. 1) is 1.2 ppm/K or more and 3.5 ppm/K or less, and further preferably 1.3 ppm/K or more and 3.2 ppm/K or less, whereas a thermal expansion coefficient in a cross-sectional direction B (corresponding to a radial direction of the honeycomb structure 1, see FIG. 2) orthogonal to the central axis direction A is 0.8 ppm/K or more and 2.5 ppm/K or less. The above thermal expansion coefficient indicates a value in a temperature change of 40° C. to 800° C. Furthermore, a thermal expansion curve in which the values of the thermal expansion coefficient with the temperature change are plotted indicates a linear expansion change along each of the central axis direction A and the cross-sectional direction B. Furthermore, in the honeycomb structure 1, a value of a compressive strength in the central axis direction A is 15 MPa or more.

Furthermore, in the honeycomb structure 1 of the present embodiment, in the thermal expansion curves in the central axis direction A and the cross-sectional direction B, a value of Y ppm/K indicates a range of 0.5X to 1.5X, when an average thermal expansion coefficient in a temperature range of 40° C. to 800° C. is defined as X ppm/K and an average thermal expansion coefficient in a temperature range of 200° C. to 600° C. is defined as Y ppm/K. That is, the average thermal expansion coefficient Y in the temperature range of 200° C. to 600° C. is proportional in a range of 0.5 time to 1.5 times the average thermal expansion coefficient X in the temperature range of 40° C. to 800° C. (0.5X<Y<1.5X), and possesses a linearity. Therefore, the average thermal expansion coefficient Y (200° C. to 600° C.) is in a range of ±50% of the value of the average thermal expansion coefficient X (40° C. to 800° C.).

Here, it is known that in the case of a vanadium based SCR catalyst, generation of ammonia which is a reducing agent is started at 200° C. or more by decomposition of urea. Furthermore, it is known that decomposition of vanadium pentoxide which is a main component of the SCR catalyst is started at 600° C. or more. Therefore, the temperature range of a section thermal expansion ratio of the average thermal expansion coefficient Y is set to the abovementioned range of 200° C. to 600° C. In consequence, it is indicated that the honeycomb structure has linear thermal expansion properties in this temperature range.

The honeycomb structure 1 is a cordierite honeycomb including a cordierite component containing the abovementioned three components of silicon, aluminum and magnesium as the constitutional elements, and in a case where a total ratio obtained by converting the three components in terms of oxides is defined as 100%, a ratio of silicon oxide (silica) is 50% or more, a ratio of aluminum oxide (alumina)

is 15% or more and 45% or less, and a ratio of magnesium oxide (magnesia) is 5% or more and 30% or less, and further preferably, a ratio of silicon oxide is 50% or more and 65% or less, a ratio of aluminum oxide is 18% or more and 36% or less, and a ratio of magnesium oxide is 8% or more and 21% or less.

A forming material including the three components of silicon oxide, aluminum oxide and magnesium oxide at the above ratios is extruded, a honeycomb formed body (not shown) having partition walls defining a plurality of cells is formed, and then the obtained honeycomb formed body is fired at a firing temperature of 1250° C. or more and 1370° C. or less to manufacture the honeycomb structure 1. As raw materials, there are used kaolin or talc which is a natural raw material, alumina or aluminum hydroxide which is a synthetic raw material, and silica which is the natural raw material or the synthetic raw material. Among these raw materials, expensive synthetic raw materials can be omitted, as long as the above cordierite composition can be maintained.

Here, it is known that at the firing temperature lower than 1250° C., silicon oxide is present as a crystal structure of cristobalite, and the value of the thermal expansion coefficient remarkably increases (e.g., around 5.0 to 10.0 ppm/K). On the other hand, at a firing temperature in excess of 1370° C., there is hardly a difference from a conventional cordierite honeycomb firing temperature (e.g., 1430° C.), an effect of shortening of firing time or the like deteriorates, and the value in the central axis direction A is smaller than that in the cross-sectional direction B. To eliminate such a problem, the firing temperature is set to 1250° C. or more and 1370° C. or less.

It is generally known that in the case of the conventional cordierite honeycomb, the value of the thermal expansion coefficient in the cross-sectional direction B is larger than the value of the thermal expansion coefficient in the central axis direction A. However, in the honeycomb structure 1 of the present embodiment, firing is performed at the firing temperature lower than that of the conventional cordierite honeycomb, and hence the value of the thermal expansion coefficient in the central axis direction A is higher than the value of the thermal expansion coefficient in the cross-sectional direction B. That is, the value of the thermal expansion coefficient is reversed.

Consequently, the firing is performed at the low firing temperature as compared with the conventional cordierite honeycomb, but the thermal expansion coefficient in the cross-sectional direction B can be minimized, and in a firing step, especially generation of cracks along the radial direction of the honeycomb structure 1 can be inhibited. Furthermore, in the honeycomb structure 1 of the present embodiment, it is indicated that the firing temperature is low, but the honeycomb structure has the compressive strength in the central axis direction A to the same degree as in the conventional cordierite honeycomb, and the honeycomb structure has a sufficient resisting strength.

In a case where the SCR catalyst is used for a large-size diesel engine, an amount of an exhaust gas to be treated is large as compared with a usual car engine or the like, and for the purpose that a passing air resistance is not impaired, there is used the honeycomb structure 1 in which a honeycomb diameter is necessarily large. On the other hand, it is known that a reaction distance of the SCR catalyst is comparatively short. Therefore, to obtain an effect of the SCR catalyst, the reaction distance, i.e., a length of the honeycomb structure is not so much required. Therefore, the honeycomb structure has a configuration in which a honeycomb length is short for the honeycomb diameter. When the catalyst exposed to the exhaust gas is seen in the form of a cross section vertical to a length direction, a central portion of the cross section usually has a higher temperature than a peripheral portion. In the honeycomb structure in which the honeycomb diameter is larger than the honeycomb length, tensile stress which acts in a peripheral direction becomes dominant in a circumferential surface of the honeycomb structure, and the generation of the cracks from the circumferential surface of the honeycomb structure toward the center thereof is induced. The tensile stress which acts in the peripheral direction in the circumferential surface of the honeycomb structure depends on the thermal expansion in the cross-sectional direction B, and hence it is important to minimize the thermal expansion coefficient in the cross-sectional direction B for the purpose of preventing the above generation of the cracks.

Figure 3:
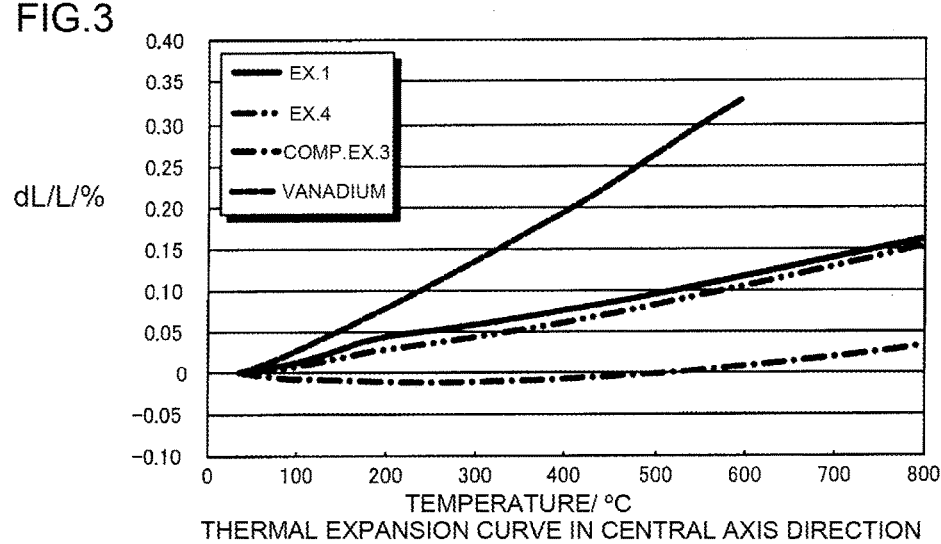
FIG. 3 is a graph showing thermal expansion curves of Example 1, Example 4, Comparative Example 3 and a vanadium based solid SCR catalyst in a central axis direction.

For the SCR catalyst, the vanadium based catalyst is used as one of typical SCR catalysts, and the catalyst is loaded onto a ceramic carrier. As shown in FIG. 3, the vanadium based catalyst has a high thermal expansion coefficient. In a case where the vanadium based catalyst is loaded onto a conventional cordierite honeycomb carrier, a thermal expansion difference between the catalyst and the carrier is large, the catalyst peels from the carrier to scatter, and a catalyst function might be lost. On the other hand, when the thermal expansion coefficient of the ceramic carrier is increased to decrease the thermal expansion difference between the carrier and the vanadium based catalyst, the peeling of the catalyst can be prevented, but the ceramic carrier is broken by the thermal stress. In the honeycomb structure 1 of the present embodiment, the value of the thermal expansion coefficient in the central axis direction A is increased to decrease the thermal expansion difference from a titania-vanadia catalyst, and the catalyst is prevented from peeling from the partition walls 4. Furthermore, the thermal expansion coefficient in the cross-sectional direction B is minimized, so that the ceramic carrier can be prevented from being broken by the thermal stress. It is to be noted that the vanadium based SCR catalyst of FIG. 3 is the honeycomb structure itself constituted of the vanadium based catalyst, and is called a solid catalyst.

Figure 4:
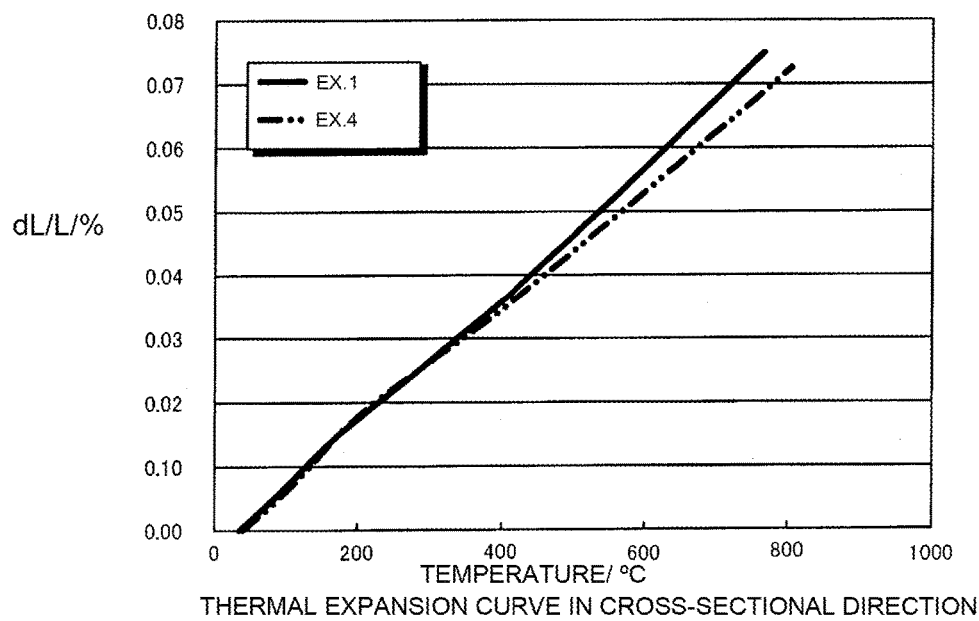
FIG. 4 is a graph showing thermal expansion curves of Example 1 and Example 4 in a cross-sectional direction.

FIG. 3 and FIG. 4 show thermal expansion curves in the central axis direction A and the cross-sectional direction B (see examples mentioned below for Examples 1 and 4 and Comparative Example 3). It is seen that the vanadium based catalyst of FIG. 3 indicates linear thermal expansion characteristics, whereas a conventional cordierite honeycomb carrier (Comparative Example 3) indicates nonlinear thermal expansion characteristics. Differences between the linear thermal expansion characteristics and the nonlinear thermal expansion characteristics promote the peeling of the catalyst from the partition walls 4. Therefore, to prevent the peeling of the catalyst, it is important that the ceramic carrier has the linear thermal expansion characteristics similar to those of the vanadium based catalyst.

In the honeycomb structure 1 of the present embodiment, desired thermal expansion characteristics can be obtained while suppressing a use amount of the expensive synthetic raw material in the forming material.

Hereinafter, examples of the honeycomb structure of the present invention and the manufacturing method of the honeycomb structure will be described, but the honeycomb structure of the present invention and the manufacturing method of the honeycomb structure are not limited to these embodiments.

EXAMPLES (1) Ratio of Cordierite Component, and Firing Temperature

A plurality of materials of talc, kaolin (kaolin or calcinated kaolin), alumina (aluminum oxide or aluminum hydroxide) and silica were combined and blended to obtain a ratio of a cordierite component defined in a honeycomb structure of the present invention, and water and a forming aid were added and kneaded to obtain a forming material, and the forming material was extruded through an extruding die (a forming step), and honeycomb formed bodies obtained in this manner were dried, finished and fired at a firing temperature of the highest temperature of 1250° C. to 1370° C. to obtain honeycomb structures, respectively (Examples 1 to 7). As shown in Table 1, blend ratios of raw materials vary in Examples 1 and 2 (Material 1), Examples 3 to 5 (Material 2), Example 6 (Material 3) and Example 7 (Material 4). Furthermore, honeycomb formed bodies extruded at the same blend ratios as in Examples 1 to 5 were fired at different firing temperatures, to obtain honeycomb structures (Comparative Examples 1 to 5). Additionally, honeycomb structures (Comparative Examples 6 and 7) were obtained from honeycomb formed bodies extruded by using forming materials (Materials 5 and 6) prepared at blend ratios which deviated from the ratio of the cordierite component defined in the honeycomb structure of the present invention.

Additionally, in each of Examples 1 and 2 and Comparative Examples 1 and 2, the forming material did not include aluminum oxide, aluminum hydroxide and silicon oxide. Table 1 mentioned below shows conclusions of blend ratios of raw materials of materials and ratios of cordierite components.

TABLE 1

| | Forming raw material blend ratio | | | | Ratio of cordierite component | | |
|---|---|---|---|---|---|---|---|
| | Kaolin wt. % | Talc wt. % | Alumina wt. % | Silica wt. % | $SiO_2$ wt. % | $Al_2O_3$ wt. % | MgO wt. % |
| Material 1 | 50 | 50 | 0 | 0 | 60 | 24 | 16 |
| Material 2 | 40 | 40 | 19 | 1 | 51 | 36 | 13 |
| Material 3 | 40 | 60 | 0 | 0 | 62 | 18 | 20 |
| Material 4 | 75 | 25 | 0 | 0 | 57 | 35 | 8 |
| Material 5 | 65 | 15 | 0 | 20 | 65 | 30 | 5 |
| Material 6 | 25 | 75 | 0 | 0 | 63 | 12 | 25 |

The firing temperature in each of Examples 1 to 7 and Comparative Examples 1 to 7 will be described in detail. The honeycomb formed bodies having the same cordierite component ratios were fired at firing temperatures of 1275° C. (Example 1) and 1250° C. (Example 2), to obtain the honeycomb structures. Furthermore, honeycomb formed bodies having the same cordierite component ratio as in Examples 1 and 2 were fired at firing temperatures of 1350° C. (Comparative Example 1) and 1200° C. (Comparative Example 2), to obtain the honeycomb structures. Additionally, honeycomb formed bodies having the same cordierite component ratio were fired at firing temperatures of 1350° C. (Example 3), 1275° C. (Example 4) and 1370° C. (Example 5), to obtain the honeycomb structures, and furthermore, honeycomb formed bodies having the same cordierite component ratio as in Examples 3 to 5 were fired at firing temperatures of 1400° C. (Comparative Example 3), 1385° C. (Comparative Example 4) and 1250° C. (Comparative Example 5), to obtain the honeycomb structures.

In the honeycomb structures of Examples 1 to 7 and Comparative Examples 1 to 7, manufacturing conditions of the honeycomb structures except the above conditions were the same. As to each of the obtained honeycomb structures (cordierite honeycombs), there were measured and calculated a porosity [%], a pore diameter [μm], a compressive strength [MPa] in a central axis direction, a thermal expansion coefficient XA [ppm/K] at 40° C. to 800° C. in a central axis direction A, a thermal expansion coefficient YA [ppm/K] at 200° C. to 600° C. in the central axis direction A, a ratio [%] of the thermal expansion coefficient YA to the thermal expansion coefficient XA in the central axis direction A, a thermal expansion coefficient XB [ppm/K] at 40° C. to 800° C. in a cross-sectional direction B, a thermal expansion coefficient YB [ppm/K] at 200° C. to 600° C. in the cross-sectional direction B, and a ratio [%] of the thermal expansion coefficient YB to the thermal expansion coefficient XB in the cross-sectional direction B.

(2) Measurement of Porosity

The porosity [%] indicates a porosity of a porous material constituting partition walls of the honeycomb structure. Here, in a case where the porosity [%] of the partition walls is smaller than 10%, an amount of the catalyst which can be loaded is limited, whereas in a case where the porosity is in excess of 70%, the partition walls of the honeycomb structure become brittle and are easy to fall. In the present example, the honeycomb structure was prepared so that the porosity [%] was generally in a range of 10% or more and 40% or less. The porosity [%] of the partition walls of the honeycomb structure was measured by mercury porosimetry in conformity to JIS R1655.

(3) Measurement of Pore Diameter

A pore diameter [μm] indicates a median pore diameter (a median diameter) of the porous material constituting the partition walls of the honeycomb structure. When the pore diameter is excessively small, it becomes difficult to load the catalyst into pores. On the other hand, when the pore diameter is excessively large, the partition walls of the honeycomb structure become brittle and are easy to fall. The pore diameter [μm] of the honeycomb structure was measured by the mercury porosimetry in conformity to JIS R1655.

(4) Compressive Strength [MPa] in Central Axis Direction

A compressive strength [MPa] of the honeycomb structure in the central axis direction is "an A-axis compressive strength" stipulated in JASO Standard M505-87 which is a car standard issued by the Society of Automotive Engineers of Japan, and the compressive strength is generally preferably 5 MPa or more, further preferably 10 MPa or more, and especially preferably 15 MPa or more. The compressive strength [MPa] in the central axis direction A exceeds the above numeric value, so that a resisting strength of the honeycomb structure can be improved. Here, as to the compressive strength (the A-axis compressive strength) in the central axis direction A, on the basis of the above standard, a round pillar-shaped sample having a diameter of 25.4 mm (1 inch) and a height of 25.4 mm (1 inch) is cut out from the honeycomb structure and a compressive load is gradually applied to the sample in its through channel direction. The compressive load is increased and a value of a pressure when breaking the sample is defined as the compressive strength [MPa] in the central axis direction A.

(5) Thermal Expansion Coefficient [ppm/K]

A thermal expansion coefficient [ppm/K] was obtained by measuring an average thermal expansion coefficient in each of temperature ranges from 40° C. to 800° C. and from 200°

C. to 600° C. of the porous material constituting the partition walls of the honeycomb structure by use of a differential detection type of thermal dilatometer. Further specifically, a measurement sample of vertically 5 mm×horizontally 5 mm×length of 50 mm was first prepared from a honeycomb structure body of the honeycomb structure. A length direction of this measurement sample is defined as an extending direction of cells of the honeycomb structure body in the central axis direction A, and a direction orthogonal to the length direction is defined as the cross-sectional direction B.

(6) Ratios of Linear Thermal Expansion Properties

According to the above (5), ratios of the thermal expansion coefficients YA and YB at 200° C. to 600° C. to the thermal expansion coefficients XA and XB at 40° C. to 800° C. were calculated on the basis of the thermal expansion coefficient XA at 40° C. to 800° C. and the thermal expansion coefficient YA at 200° C. to 600° C. in the central axis direction A, and the thermal expansion coefficient XB at 40° C. to 800° C. and the thermal expansion coefficient YB at 200° C. to 600° C. in the cross-sectional direction B, which were measured by the above (5). Here, the calculation of the ratios is based on Equations (A) and (B) mentioned below.

Ratio [%] in the central axis direction=(thermal expansion coefficient $YA$–thermal expansion coefficient $XA$)/thermal expansion coefficient $XA$×100   (A)

Ratio [%] in the cross-sectional direction=(thermal expansion coefficient $YB$–thermal expansion coefficient $XB$)/thermal expansion coefficient $XB$×100   (B)

Table 2 mentioned below shows conclusions of blend ratios, blend ratios of cordierite components, firing temperatures, and results of respective measurements and calculations measured and calculated by the above (2) to (6) to the obtained honeycomb structures.

invention, each of the thermal expansion coefficients [ppm/K] in the central axis direction A and the cross-sectional direction B was within the range of the present invention and that the thermal expansion coefficients XA and YA in the central axis direction A were higher than the thermal expansion coefficients XB and YB in the cross-sectional direction B, and the results different from those of the conventional cordierite honeycomb were indicated. Furthermore, it was indicated that each compressive strength (the A-axis compressive strength) in the central axis direction A was 15 MPa or more, and it was confirmed that the honeycomb structure had a resisting strength of the same degree as in the conventional cordierite honeycomb. Specifically, the firing temperature was low and aluminum oxide, aluminum hydroxide and silicon oxide were not used in a raw material blend, but it was possible to obtain the honeycomb structure (the cordierite honeycomb) having desirable thermal expansion characteristics. As a result, it is possible to lower the firing temperature and to decrease manufacturing cost and equipment cost. Furthermore, aluminum oxide, aluminum hydroxide and silicon oxide are not used, and hence an effect of decreasing the manufacturing cost is also produced.

On the other hand, in each of the honeycomb structures of Comparative Examples 1 to 7 prepared to deviate from the firing temperature and the ratio of the cordierite component defined in the present invention, each thermal expansion coefficient [ppm/K] at 40° C. to 800° C. in the central axis direction A was out of the range of the present invention. That is, it was confirmed that the thermal expansion coefficient of the honeycomb structure in the central axis direction A was excessively large. Additionally, at the firing temperature of 1350° C., the softening of the honeycomb structure was confirmed and it was not possible to measure the porosity and the like, even when the ratio of the cordierite component was the same as in Examples 1 and 2

TABLE 2

| | Material | Firing temp. ° C. | Porosity % | Pore dia. μm | Compressive strength in central axis direction Mpa | CTE (XA) in central axis direction (40° C. to 800° C.) ppm/K | CTE (YA) in central axis direction (200° C. to 600° C.) ppm/K | Ratio of YA to XA in central axis direction % | CTE (XB) in cross-sectional direction (40° C. to 800° C.) ppm/K | CTE (YB) in cross-sectional direction (200° C. to 600° C.) ppm/K | Ratio of YB to XB in cross-sectional direction % |
|---|---|---|---|---|---|---|---|---|---|---|---|
| Example 1 | Material 1 | 1275 | 34 | 0.9 | 17 | 2.1 | 2.4 | 16 | 1.0 | 1.1 | 10 |
| Example 2 | Material 1 | 1250 | 35 | 1.4 | 24 | 2.6 | 2.6 | 0 | 2 | 1.4 | −30 |
| Example 3 | Material 2 | 1350 | 31 | 5 | 27 | 1.6 | 2.1 | 31 | 1.3 | 1.2 | −8 |
| Example 4 | Material 2 | 1275 | 35 | 1 | 25 | 2.0 | 2.3 | 15 | 1.0 | 1.0 | 0 |
| Example 5 | Material 2 | 1370 | 26 | 4 | 20 | 1.3 | 1.6 | 23 | 0.9 | 0.9 | 0 |
| Example 6 | Material 3 | 1275 | 14 | 4 | 18 | 3.2 | 2.2 | −31 | 2.4 | 2 | −17 |
| Example 7 | Material 4 | 1275 | 35 | 1 | 25 | 3.2 | 2.3 | −28 | 2.5 | 2.1 | −16 |
| Comparative Example 1 | Material 1 | 1350 | Softened | Softened | Softened | Softened | Softened | Softened | Softened | Softened | Softened |
| Comparative Example 2 | Material 1 | 1200 | 36 | 1 | 25 | 9.7 | 5.5 | −43 | 10 | 6 | −40 |
| Comparative Example 3 | Material 2 | 1400 | 35 | 5 | 15 | 0.4 | 1.2 | 200 | 0.6 | 0.9 | 50 |
| Comparative Example 4 | Material 2 | 1385 | 30 | 5 | 15 | 0.8 | 1.4 | 75 | 0.9 | 1.4 | 56 |
| Comparative Example 5 | Material 2 | 1250 | 40 | 1 | 18 | 5.2 | 4.4 | −15 | 6 | 5.1 | −15 |
| Comparative Example 6 | Material 5 | 1275 | 44 | 1 | 10 | 6.7 | 2.9 | −57 | 7 | 6.3 | −10 |
| Comparative Example 7 | Material 6 | 1275 | Softened | Softened | Softened | Softened | Softened | Softened | Softened | Softened | Softened |

As shown in Table 2, it was confirmed that in each of the honeycomb structures of Examples 1 to 7 prepared by use of the ratio of the cordierite component defined in the present (Comparative Example 1). On the other hand, in a case where the firing temperature was set to 1200° C. on the same conditions as in Examples 1 and 2 and Comparative Example 1, a thermal expansion ratio in the central axis direction indicated a remarkably high value (9.7 ppm/K) (Comparative Example 2). As described above, it is considered that at the firing temperature of 1200° C., silicon oxide in the cordierite component is present as a crystal structure of cristobalite, and hence the thermal expansion coefficient increases. On the other hand, it was confirmed that, in a case where firing was performed at a firing temperature of 1400° C. (Comparative Example 3), i.e., in a case where the firing was performed on firing conditions close to those of the conventional cordierite honeycomb, the thermal expansion coefficient in the range of 40° C. to 800° C. in each of the central axis direction A and the cross-sectional direction B indicated a low value smaller than 1 [ppm/K] and the value of the thermal expansion coefficient in the cross-sectional direction B to that in the central axis direction A was large. Furthermore, it was confirmed that the honeycomb structure (Comparative Example 7) containing 75% of talc was softened as a whole even at a firing temperature of 1275° C.

A honeycomb structure of the present invention and a manufacturing method of the honeycomb structure can be used in manufacturing of a honeycomb structure which can be utilized in a car exhaust gas purifying catalyst carrier, a diesel particulate removing filter, a heat reservoir for a burning device or the like.

DESCRIPTION OF REFERENCE NUMERALS

1: honeycomb structure, 2a: one end face, 2b: the other end face, 3: cell, 4: partition wall, 5: honeycomb structure body, A: central axis direction, and B: cross-sectional direction.

What is claimed is:

1. A honeycomb structure including a cordierite component and comprising partition walls defining a plurality of cells which extend from one end face to the other end face and become through channels for a fluid,
   wherein an average thermal expansion coefficient of the honeycomb structure in a central axis direction is 1.2 ppm/K or more and 3.5 ppm/K or less in a temperature range of 40° C. to 800° C.,
   an average thermal expansion coefficient in a cross-sectional direction orthogonal to the central axis direction is 0.8 ppm/K or more and 2.5 ppm/K or less in the temperature range of 40° C. to 800° C., and
   the average thermal expansion coefficient in the cross-sectional direction orthogonal to the central axis direction is at least 0.3 ppm/K lower than the average thermal expansion coefficient in the central axis direction.

2. The honeycomb structure according to claim 1,
   wherein in thermal expansion curves in the central axis direction and the cross-sectional direction, Y is in a range of 0.5X to 1.5X, when the average thermal expansion coefficient in a temperature range of 40° C. to 800° C. is defined as X ppm/K and an average thermal expansion coefficient in a temperature range of 200° C. to 600° C. is defined as Y ppm/K.

3. The honeycomb structure according to claim 1,
   wherein in a case where three components of silicon, aluminum and magnesium are included as constitutional elements and an oxide total ratio of the three components is defined as 100%,
   a ratio of silicon oxide is 50% or more,
   a ratio of aluminum oxide is 15% or more and 45% or less, and
   a ratio of magnesium oxide is 5% or more and 30% or less.

4. The honeycomb structure according to claim 1,
   wherein a forming material does not include aluminum oxide, aluminum hydroxide or silicon oxide.

5. The honeycomb structure according to claim 1,
   wherein a compressive strength of the honeycomb structure in the central axis direction is 15 MPa or more.

6. A manufacturing method of a honeycomb structure in which the honeycomb structure according to claim 1 is manufactured,
   the method comprising:
   a forming step of forming, from a forming material, a honeycomb formed body comprising partition walls defining a plurality of cells which extend from one end face to the other end face and become through channels for a fluid; and
   a firing step of firing the honeycomb formed body, wherein the highest temperature in the firing step is 1250° C. or more and 1370° C. or less.

* * * * *